US006304686B1

(12) United States Patent
Yamate et al.

(10) Patent No.: US 6,304,686 B1
(45) Date of Patent: Oct. 16, 2001

(54) METHODS AND APPARATUS FOR MEASURING DIFFERENTIAL PRESSURE WITH FIBER OPTIC SENSOR SYSTEMS

(75) Inventors: Tsutomu Yamate, Brookfield; Rogerio T Ramos, Bethel; Raghu Madhavan, Brookfield; Robert J. Schroeder, Newtown, all of CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/500,501

(22) Filed: Feb. 9, 2000

(51) Int. Cl.[7] .................................. G02B 6/00; G02B 6/36
(52) U.S. Cl. .................................................. 385/13
(58) Field of Search ............................... 385/11, 12, 13, 385/14, 24, 31, 37; 374/117, 201; 73/702, 862.381, 723, 24.05, 32 A

(56) References Cited

U.S. PATENT DOCUMENTS

| | | | |
|---|---|---|---|
| 4,526,480 | * | 7/1985 | Ward .................................... 374/117 |
| 4,574,639 | * | 3/1986 | Ward ..................................... 73/374 |
| 4,644,796 | * | 2/1987 | Ward ..................................... 73/702 |
| 4,644,803 | * | 2/1987 | Ward et al. ...................... 73/862.381 |
| 4,669,316 | * | 6/1987 | Olson et al. ............................ 73/310 |
| 5,380,995 | | 1/1995 | Udd et al. ........................ 250/227.18 |
| 5,386,729 | | 2/1995 | Reed et al. .............................. 73/705 |
| 5,841,131 | | 11/1998 | Schroeder et al. .............. 250/227.17 |

OTHER PUBLICATIONS

Xie, H.M. et al. Side–hole Fiber for Fiber–Optic Pressure Sensing. *Optics Letters.* vol. 11, No. 5 (May 1986) pp. 333–335.

* cited by examiner

Primary Examiner—Akm E. Ullah
(74) Attorney, Agent, or Firm—William B. Batzer; David P. Gordon

(57) ABSTRACT

Methods and apparatus for measuring differential pressure with fiber optic sensor systems are disclosed. The apparatus of the present invention include both monopolar and bipolar sensors, sensors incorporating side-hole fibers, sensors incorporating fibers without side holes, FBGs subjected to transverse strain, and FBGs subjected to longitudinal strain. All of the embodiments utilize FBGs. Two embodiments utilize a piston having oppositely extending rods, each of which is exposed to a different pressure. Seven embodiments utilize one or more silica diaphragms coupled to a silica body and exposed to two pressures. In each of these embodiments, pressure is converted into movement of the piston or diaphragm which is then used to strain the FBG(s). When each FBG is interrogated, the spectral information is indicative of the strain exerted by the piston or diaphragm on the FBG and thus the difference between the two pressures. Tenth and eleventh embodiments provide apparatus and methods of measuring a differential pressure.

24 Claims, 7 Drawing Sheets

METHODS AND APPARATUS FOR MEASURING DIFFERENTIAL PRESSURE WITH FIBER OPTIC SENSOR SYSTEMS

BACKGROUND OF THE INVENTION

1. Field of the Invention

The invention relates to fiber optic sensor systems. More particularly, the invention relates to methods and apparatus for measuring differential pressure with fiber optic sensor systems. Most particularly, the invention relates to differential pressure measurements made with a fiber Bragg grating (FBG).

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direct ion at the interface of the two media. In addition to changing direction at the interface of two media, a portion of the incident beam is reflected at the interface such that the energy of the beam travelling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam travelling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagati on of light through a wave guide (optical fiber) assume an "ideal" wave guide, i.e. a straight wave guide with perfect symmetry and no imperfections. For example, the diameter of the core and the wavelength of the light transmitted through it will determine whether the fiber optic is "single mode" or "multimode". The terms single mode and multimode refer to the dimensional orientation of rays propagating through the fiber. Single mode fibers have a core with a relatively small diameter (2–12 microns) and support only one spatial mode of propagation. Multimode fibers have a core with a relatively large diameter (25–75 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing circular core with a cladding which induces stress on the core. For example, the cladding may be provided with two parallel stress members having longitudinal axes which lie in the same plane as the axis of the core.

As mentioned above, fiber optic sensors employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic pressure sensor takes advantage of the fact that ambient pressure places a strain on the jacket of an optical fiber which strains the cladding, thereby straining the core and changing the birefringence of the fiber. When a force is applied transversely to the fiber, the birefringence of the fiber changes, which changes the beat length and thus the intensity of light viewed by an intensity detector. Another type of fiber optic sensor utilizes intra-core fib er gratings as disclosed in U.S. Pat. No. 5,380,995 to Udd et al., the complete disclosure of which is incorporated by reference herein. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired. Another method of writing the grating on the fiber is to focus a laser through the side of the fiber and write the grating one line at a time.

When a fiber optic is provided with a grating ("fiber Bragg grating" or "FBG"), the FBG is interrogated with a light source and a detector, and the portion of the fiber containing the FBG is subjected to transverse strain, two spectral peaks are produced (one for each polarization axis) and the peak to peak separation is proportional to the strain. (In the case of longitudinal strain, a single peak is produced and the movement of the peak from one wavelength to another is indicative of a change in the strain.) Spectral demodulation systems such as tunable Fabry-Perot filters, acousto-optical filters, or optical spectrum analyzers coupled to the fiber detect the two spectral outputs. The spectral outputs are analyzed and the strain is determined by measuring the peak to peak separation. Depending on how the fiber optic is deployed, the strain may be related to temperature, pressure, or another environmental measure.

One shortcoming of this type of sensor system is that dual peaks are only discernable in an ordinary single mode fiber when there is considerable strain, e.g. at very high pressure. Various structures are disclosed for mechanically influencing the fiber such that isotropic forces are converted to anisotropic forces to produce birefringence and to magnify the effect of strain on birefringence. Exemplary structures are disclosed in co-owned U.S. Pat. No. 5,841,131.

SUMMARY OF THE INVENTION

It is therefore an object of the invention to provide methods and apparatus for measuring differential pressure with fiber optic sensor systems.

It is also an object of the invention to provide methods and apparatus for measuring differential pressure with fiber optic sensor systems which have enhanced resolution.

It is another object of the invention to provide methods and apparatus for measuring differential pressure with fiber optic sensor systems which have enhanced dynamic range.

It is still another object of the invention to provide methods and apparatus for measuring differential pressure with fiber optic sensor systems which are temperature compensated.

In accord with these objects which will be discussed in detail below, the apparatus of the present invention include both "monopolar" and "bipolar" differential pressure sensors. Monopolar sensors determine differential pressure so long as P1>P2. Bipolar sensors determine differential pressure regardless of whether P2>P1. Embodiments of the apparatus of the invention also include: differential pressure sensors incorporating side-hole fibers, differential pressure sensors incorporating fibers without side holes, differential pressure sensors having FBGs subjected to transverse strain, and differential pressure sensors having FBGs subjected to longitudinal strain. All of the embodiments utilize FBGs.

According to a first, monopolar, embodiment of the invention, a piston having two oppositely extending piston rods is brought to b ear on a pair of quartz plates with a n FBG between the plates. The oppositely extending piston rods are each exposed to a different pressure. When the FBG is interrogated, the spectral information is indicative of the transverse strain exerted by the piston on the FBG and thus the difference between the two pressures.

According to a second, bipolar, embodiment of the invention, two pairs of quartz plates are disposed about a piston having two oppositely extending piston rods, one pair on each side of the piston. Two FBGs are disposed between the plates one between each pair. The oppositely extending piston rods are each exposed to a different pressure. When the FBGs are interrogated, the spectral information from each FBG is indicative of the transverse strain exerted by the piston on the FBG and thus the pressure exerted on the respective piston rod. Sensitivity of these embodiments is optionally enhanced by using side-hole fiber and by increasing the diameter of the piston.

According to a third, monopolar, embodiment, an FBG is disposed between a diaphragm and a concave end of a silica body. The silica body is provided with holes which extend from the concave end to an opposite end. The diaphragm is exposed to one pressure and the open ends of the holes are exposed to another pressure. When the FBG is interrogated, the spectral information is indicative of the transverse strain exerted by the diaphragm on the FBG and thus the difference between the two pressures.

A fourth, monopolar, embodiment is substantially the same as the third embodiment except that both ends of the silica body are concave and both ends are covered with a diaphragm. The space between the two diaphragms is filled with an uncompressible fluid, e.g., an hydraulic fluid, which couples the two diaphragms. Each diaphragm is coupled to a different pressure. When the FBG is interrogated, the spectral information is indicative of the transverse strain exerted by the diaphragm on the FBG and thus the difference between the two pressures.

A fifth, bipolar, embodiment is substantially the same as the fourth embodiment except that two FBGs are deployed, one between each diaphragm and the silica body. When the FBGs are interrogated, the spectral information from each FBG is indicative of the transverse strain exerted by the respective diaphragm on the respective FBG and thus the differential pressure exerted on the respective diaphragms.

A sixth, monopolar, embodiment is substantially the same as the fourth embodiment except that the two diaphragms are coupled to each other by rods which extend through the holes in the silica body.

A seventh, bipolar, embodiment is substantially the same as the sixth embodiment except that two FBGs are deployed, one between each diaphragm and the silica body. When the FBGs are interrogated, the spectral information from each FBG is indicative of the transverse strain exerted by the respective diaphragm on the respective FBG and thus the differential pressure exerted on the respective diaphragms.

According to an eighth, monopolar, embodiment, an FBG is disposed between a diaphragm and a concave end of a silica body. The silica body is provided with a trough which intersects the concave end. A tube is disposed in the trough between the silica body and the diaphragm. The diaphragm is exposed to one pressure and the interior of the tube is exposed to another pressure. When the FBG is interrogated, the spectral information is indicative of the transverse strain exerted by the diaphragm on the FBG and thus the difference between the two pressures.

An ninth, monopolar, embodiment of the invention includes a silica body having a concave end and an axial bore extending from the concave end to an opposite end. An optical fiber having an FBG is located in the axial bore and a diaphragm is placed over the concave end contacting an end of the optical fiber. A side bore in the body extends to the concave surface communicating with the space between the concave surface and the diaphragm. The side bore is exposed to one pressure and the diaphragm is exposed to a second pressure. Difference in the two pressures causes a longitudinal strain on the FBG. When the FBG is interrogated, the spectral information is indicative of the longitudinal strain exerted by the diaphragm on the FBG and thus the difference between the two pressures.

The nine embodiments described above are also characterized as methods of measuring a differential pressure. According to a tenth embodiment, a method of measuring a differential pressure includes coupling the holes of a sidehole fiber having an FBG to a first pressure source and exposing the exterior of the fiber in the area of the FBG to a second pressure source. Difference in the two pressures causes a transverse strain on the FBG. When the FBG is interrogated, the spectral information is indicative of the transverse strain an d thus the difference between the two pressures.

According to an eleventh embodiment, a pre-loaded optical fiber having an FBG is mounted in a micro-capillary tube having an elliptical or rectangular opening. The opening in the tube is coupled to one pressure source and the exterior of the tube is coupled to another pressure source. The pre-loading of the fiber introduces a bias birefringence to provide initial peak separation which makes it possible to measure small differential pressures; and the structure is substantially monolithic.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
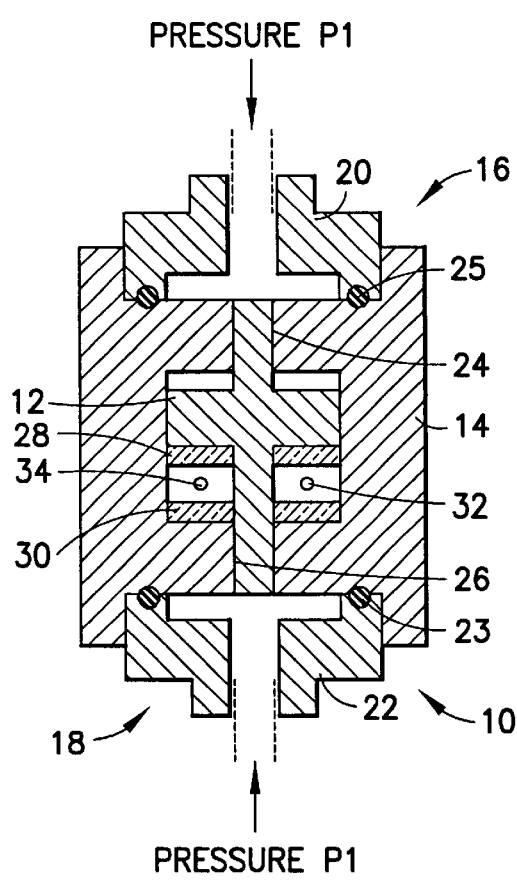
FIG. 1 is a schematic sectional view of a first, monopolar embodiment of the invention.

Referring now to FIG. 1, a first embodiment of a differential pressure sensor 10 according to the invention includes a piston 12 mounted in a housing 14. The housing 14 has two open ends 16, 18, each having a high pressure fitting 20, 22. The pressure fitting 20 is coupled to a first pressure source P1 and the pressure fitting 22 is coupled to a second pressure source P2. As shown in FIG. 1, the pressure fittings include O-rings 23, 25. The piston 12 has two oppositely extending rods 24, 26, each extending through an opposite open end 16, 18 of the housing 14. A first quartz plate 28 is affixed to one side of the piston 12 and a second fused silica plate 30 is affixed to the portion of the housing opposite the first fused silica plate. An optical fiber having a Bragg grating (FBG) 32 is located between the first and second fused silica plates 28, 30. As shown in FIG. 1, the FBG 32 is located on one side of piston rod 26 and a second fiber 34 (or another part of the first fiber) is located on the opposite side of the piston rod 26 for balancing.

From the foregoing, those skilled in the art will appreciate that when the pressure P1 is greater than the pressure P2, the piston 12 will exert a transverse strain on the FBG 32. When the FBG is interrogated, the spectral information will exhibit changes proportional to the difference between P1 and P2. When P2 is greater than or equal to P1, no pressure differential can be detected. It will also be appreciated that the placement of a biasing device such as a coil spring between the piston and the first pressure coupling can effectively permit measurements when P2>P1.

Figure 2:
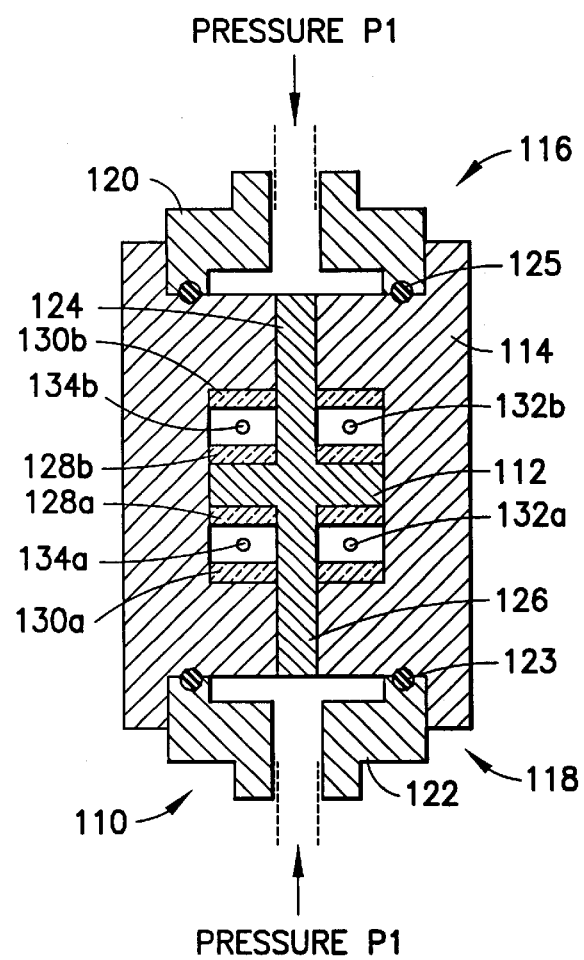
FIG. 2 is a schematic sectional view of a second, bipolar embodiment of the invention.

FIG. 2 illustrates a second, bipolar, embodiment of the invention. The embodiment of FIG. 2 is similar to the embodiment of FIG. 1 and similar features are identified with similar reference numerals (increased by 100). The difference between this embodiment and the first embodiment is that two pairs of fused silica plates 128a, 130a, 128b, 130b are disposed about the piston 112, one pair on each side of the piston with plates 128a and 128b affixed to opposite sides of the piston and plates 130a and 130b affixed to different portions of the housing. Two FBGs 132a, 132b are disposed between the plates, one FBG between each pair. A pair of balancing fibers 134a, 134b are similarly disposed. The oppositely extending piston rods 124, 126 are each exposed to a different pressure P1, P2. When the FBGs are interrogated, the spectral information from each FBG is indicative of the transverse strain exerted by the piston on the FBG and thus the pressure exerted on the piston rod. According to this embodiment, pressure differential can be detected/calculated regardless of whether P1>P2, P2>P1, or P1=P2.

Those skilled in the art will appreciate that the although the embodiments shown in FIGS. 1 and 2 have been described as having two piston rods, the piston rods and piston may be efficiently manufactured as a single unitary member which is molded or cast.

The sensitivity of the pressure sensors increases dramatically as the diameter of the piston diameter is increased because transverse load is proportional to the piston area. Those skilled in the art will appreciate that many other factors can influence the sensitivity of the sensor. As mentioned above, methods and apparatus for enhancing sensitivity are discloses in co-owned U.S. Pat. No. 5,841,131, the complete disclosure of which is hereby incorporated by reference herein.

Figure 3:
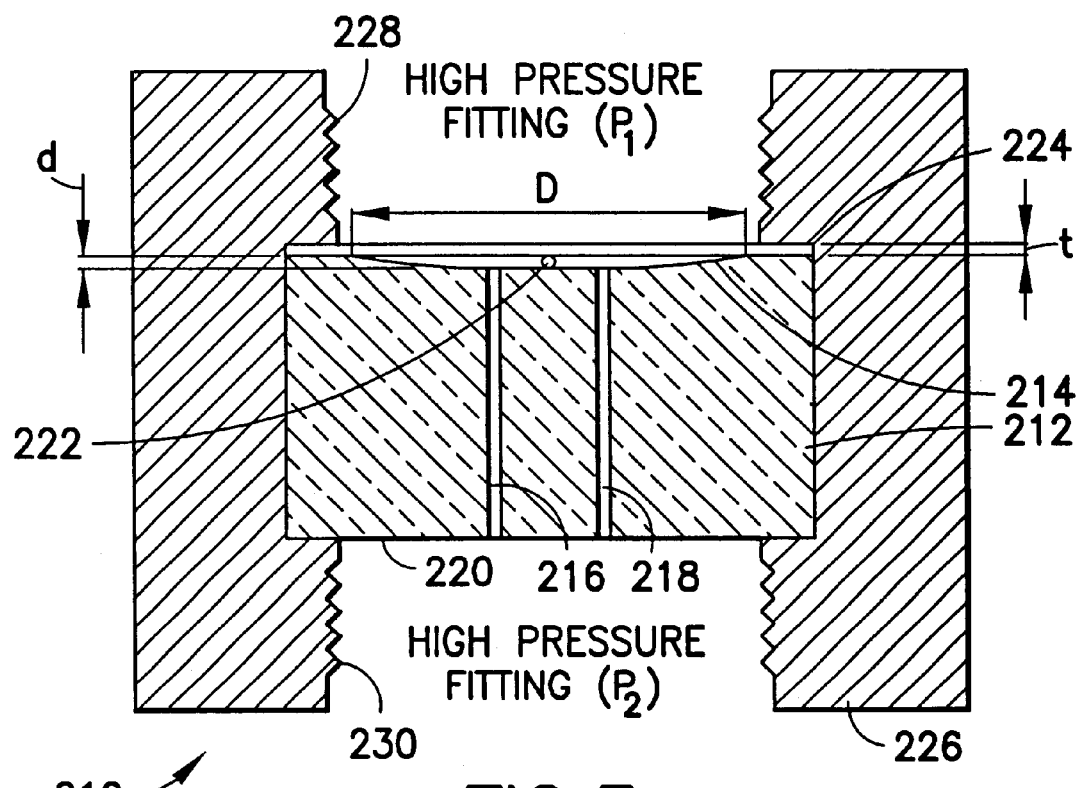
FIG. 3 is a schematic sectional view of a third, monopolar embodiment of the invention.

Turning now to FIG. 3, a third, monopolar, embodiment of the invention 210 includes a silica body 212 having a concave end 214 and a pair of through holes 216, 218 extending from the concave end 214 to an opposite end 220. An FBG 222 is disposed on the concave surface 214 of the body 212 between the holes 216, 218 and a fused silica diaphragm is placed over the concave end 214 of a silica body 212. The diaphragm is held in position by a metal housing 226 having two pressure fittings 228, 230, shown here as threaded couplings. As shown in FIG. 3, the concave surface has a depth d which is substantially the same as the diameter of the FBG and has a diameter D. The diaphragm has a thickness t and the holes 216, 218 are substantially perpendicular to the plane of the diaphragm. The diaphragm is exposed to one pressure P1 via the high pressure fitting 228 and the open ends of the holes 216, 218 are exposed to another pressure P2 via the high pressure fitting 230. The fittings may incorporate a bellows coupling to the pressure sources. When the FBG 222 is interrogated, the spectral information detected is indicative of the transverse strain exerted by the diaphragm on the FBG and thus the difference between the two pressures, if P1>P2. The force exerted by the diaphragm on the FBG is proportional to P1−P2.

Those skilled in the art will appreciate that the concave surface of the third embodiment may assume a different configuration from that shown and need only be a space within which the fiber can reside and be strained by movement of the diaphragm. It will also be appreciated that if the depth d is smaller than the diameter of the fiber, the FBG will be pre-loaded and the sensor will be bipolar.

The pressure transducer of this third embodiment is "coefficient of temperature matched" because the body, the diaphragm, and the FBG are all preferably fused silica and thus differential thermal expansions are eliminated. This also minimizes hysteresis. Any residual thermal dependency of the FBG can be minimized by choosing a doped silica for the body with the proper thermal expansion coefficient to oppose the effect of the fiber expansion. Alternatively, temperature compensation can be accomplished by detecting the absolute position of the two Bragg wavelengths, as known in the prior art. Those skilled in the art will appreciate that these types of temperature compensation can be applied to the other embodiments of the invention described herein as well.

Figure 4:
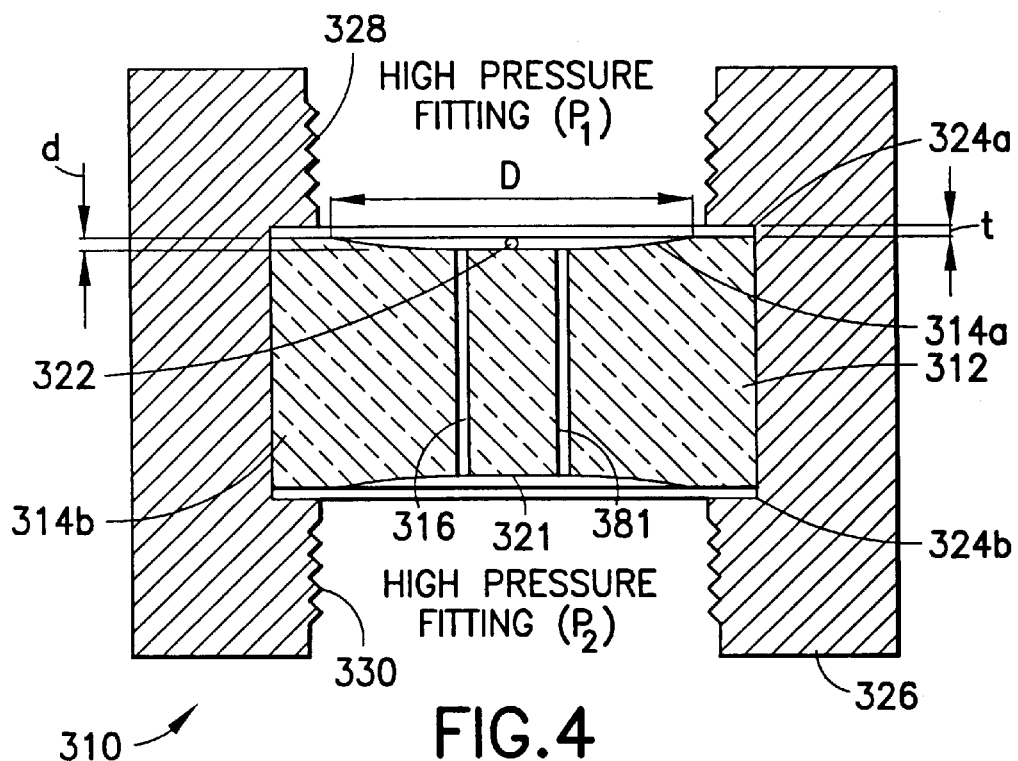
FIG. 4 is a schematic sectional view of a fourth, monopolar embodiment of the invention.

FIG. 4 illustrates a fourth, monopolar, embodiment 310 which is substantially the same as the third embodiment 210 with similar elements identified with similar reference numerals increased by 100. As shown in FIG. 4, the silica body 312 is provided with two opposite concave ends 314a, 314b, and both ends are covered with a diaphragm 324a, 324b. The space between the two diaphragms (including the holes 316, 318) is filled with an uncompressible fluid 321 which couples the two diaphragms. Each diaphragm is exposed to a different pressure P1, P2. When the FBG 322 is interrogated, the spectral information is indicative of the transverse strain exerted by the diaphragm on the FBG and thus the difference between the two pressures, if P1>P2.

Figure 5:
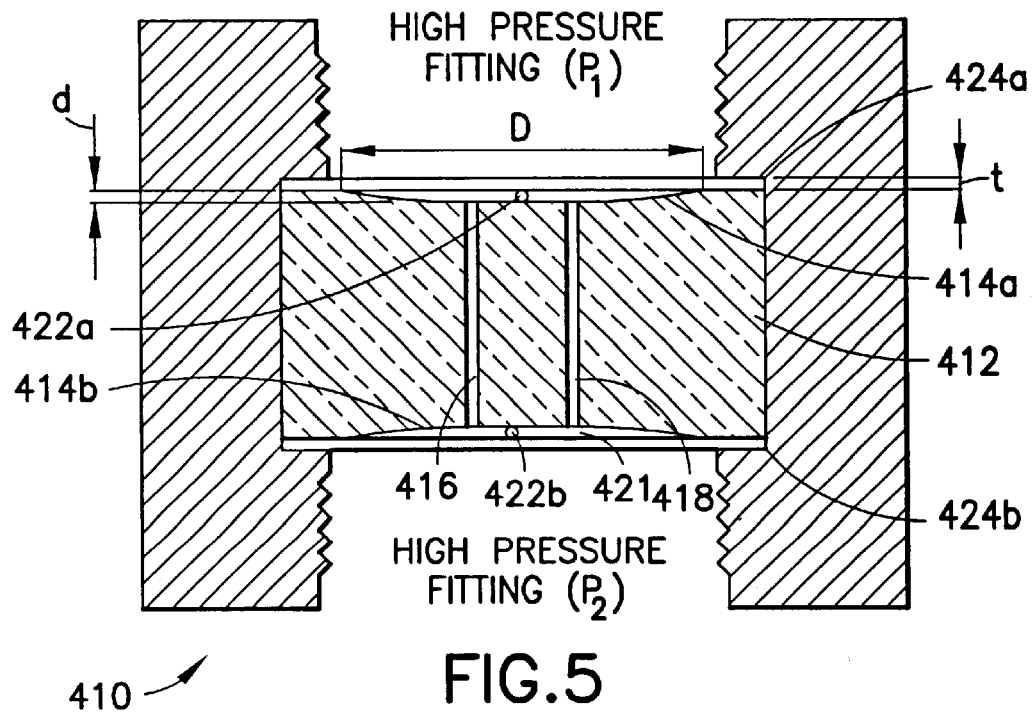
FIG. 5 is a schematic sectional view of a fifth, bipolar embodiment of the invention.

FIG. 5 illustrates a fifth, bipolar, embodiment 410 which is substantially the same as the fourth embodiment 310 with similar elements identified with similar reference numerals increased by 100. As shown in FIG. 5, two FBGs are deployed. One FBG 422a is deployed between the diaphragm 424a and the concave surface 414a of the silica body 412. The other FBG 422b is deployed between the diaphragm 424b and the concave surface 414b of the silica body 412. When the FBGs are interrogated, the spectral information from each FBG is indicative of the transverse strain exerted by the respective diaphragm on the respective FBG and thus the differential pressure exerted on the respective diaphragms.

Figure 6:
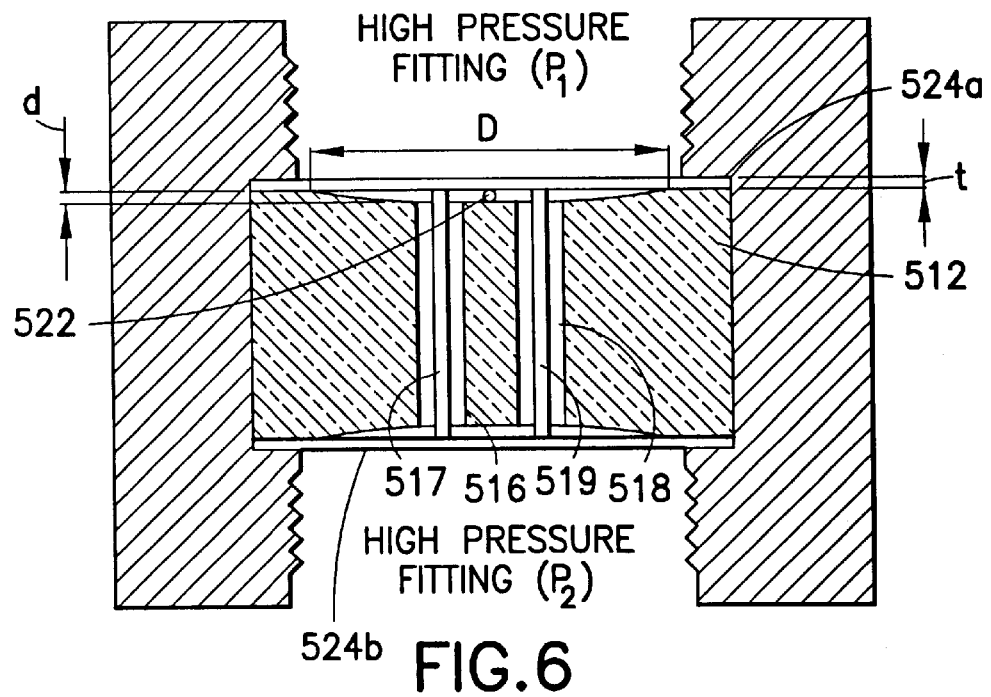
FIG. 6 is a schematic sectional view of a sixth, monopolar embodiment of the invention.

FIG. 6 illustrates a sixth, monopolar, embodiment 510 which is substantially the same as the fourth embodiment 310 shown in FIG. 4 with similar elements identified with similar reference numerals increased by 200. As shown in FIG. 6, the holes 516, 518 are somewhat larger than the holes in the fourth embodiment and a pair of rigid rods 517, 519 are disposed in the holes. The rods serve the same function as the uncompressible fluid did in the fourth embodiment, i.e. they transfer the force on the diaphragm 524b to the diaphragm 524a.

Figure 7:
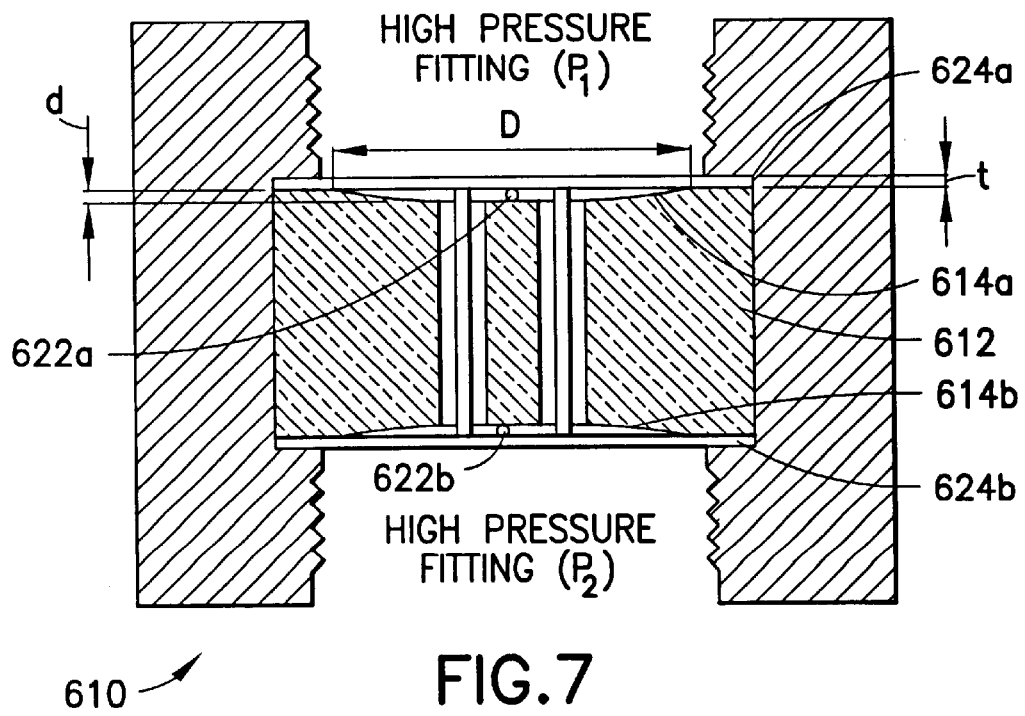
FIG. 7 is a schematic sectional view of a seventh, bipolar embodiment of the invention.

FIG. 7 illustrates a seventh, bipolar, embodiment 610 which is substantially the same as the sixth embodiment 510 shown in FIG. 6 with similar elements identified with similar reference numerals increased by 100. As shown in FIG. 7, two FDGs are deployed. One FBG 622a is deployed between the diaphragm 624a and the concave surface 614a of the silica body 612. The other FBG 622b is deployed between the diaphragm 624b and the concave surface 614b of the silica body 612. When the FBGs are interrogated, the spectral information from each FBG is indicative of the transverse strain exerted by the respective diaphragm on the respective FBG and thus the differential pressure exerted on the respective diaphragms.

Figure 8:
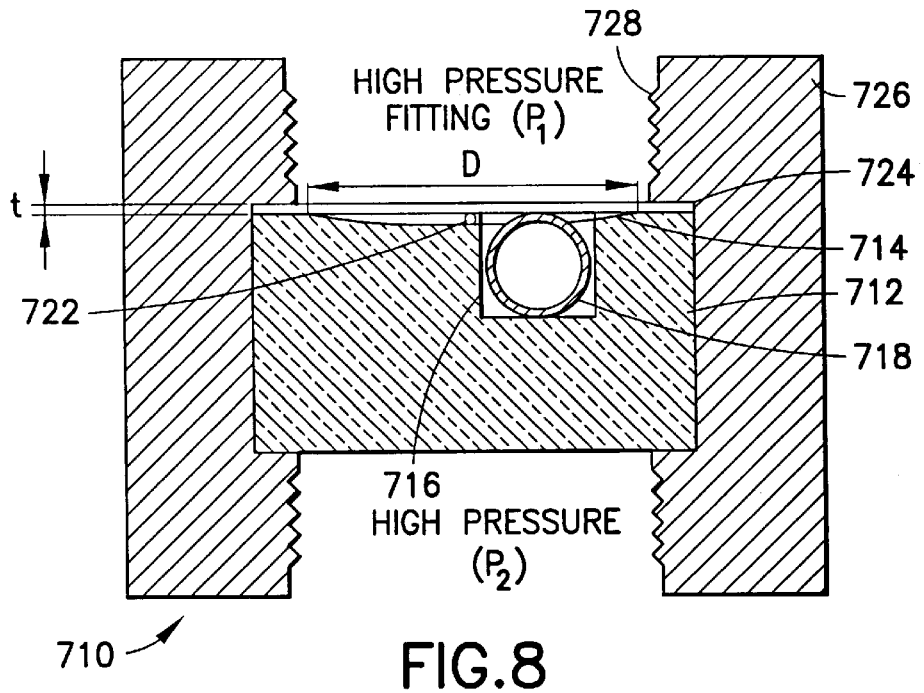
FIG. 8 is a schematic sectional view of an eighth, monopolar embodiment of the invention.

Turning now to FIG. 8, an eighth, monopolar, embodiment of the invention 710 includes a silica body 712 having a concave end 714 and a trough 716 which intersects the concave end 714. A tube 718 is disposed in the trough 716 and an FBG 722 is disposed on the concave surface 714. A fused silica diaphragm is placed over the concave end 714 of a silica body 712. The diaphragm is held in position by a metal housing 726 having a pressure fitting 728. The diaphragm is exposed to one pressure P1 via the high pressure fitting 728 and the tube 718 is coupled to a second pressure P2. When the FBG 722 is interrogated, the spectral information is indicative of the transverse strain exerted by the diaphragm on the FBG and thus the difference between the two pressures, if P1>P2. The force exerted by the diaphragm on the FBG is proportional to P1−P2.

Figure 9:
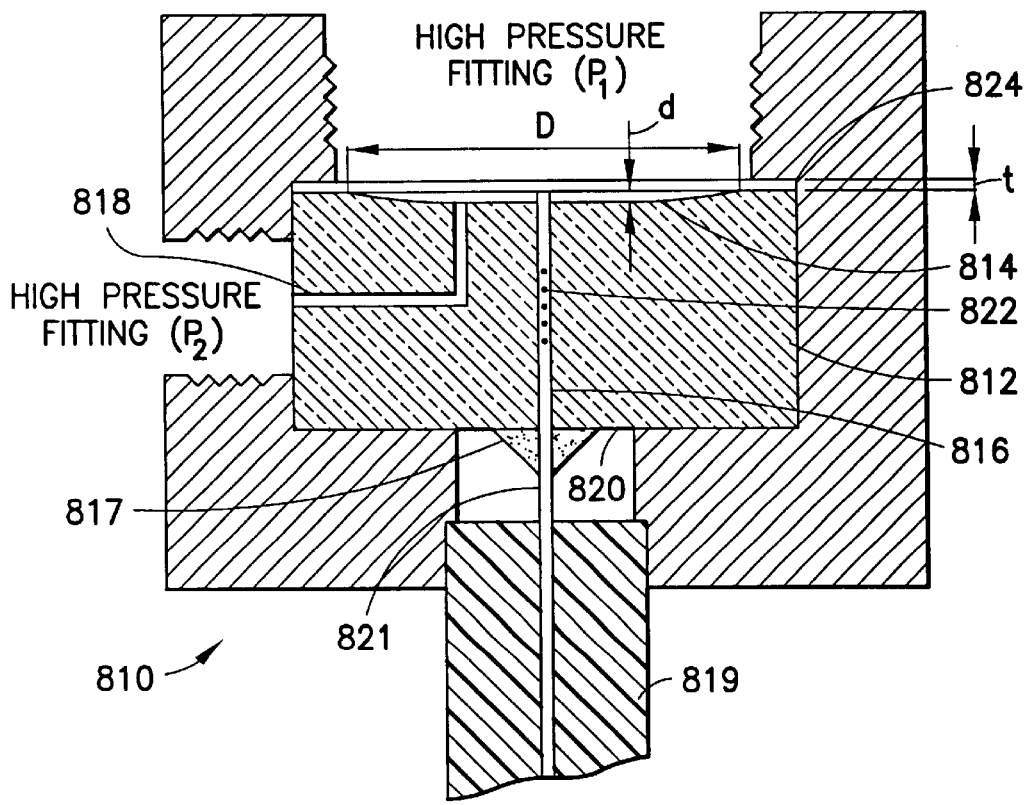
FIG. 9 is a schematic sectional view of a ninth, monopolar embodiment of the invention.

FIG. 9 illustrates a ninth, monopolar, embodiment of the invention 810. As shown in FIG. 9, the pressure sensor 810 includes a silica body 812 having a concave end 814 and an axial bore 816 extending from the concave end to an opposite end 820. An optical fiber 821 having an FBG 822 is located in the axial bore 816 and a diaphragm 824 is placed over the concave end 814 contacting an end of the optical fiber 816. The optical fiber 816 is held in place by adhesive 817 and is carried beyond the body 812 in a cable 819. A right angled side bore 818 in the body 812 extends from one side of the body to the concave surface 814 communicating with the space between the concave surface and the diaphragm 824. The side bore 818 is exposed to one pressure P2 and the diaphragm 824 is exposed to another pressure P1. Difference in the two pressures causes a longitudinal strain on the FBG. When the FBG is interrogated, the spectral information is indicative of the longitudinal strain exerted by the diaphragm on the FBG and thus the difference between the two pressures. The force exerted by the diaphragm on the FBG is proportional to P1–P2. Those skilled in the art will appreciate that the diaphragm may be coupled to the end of the optical fiber such that a large magnitude P2 will cause a tension strain on the FBG.

Figure 10:
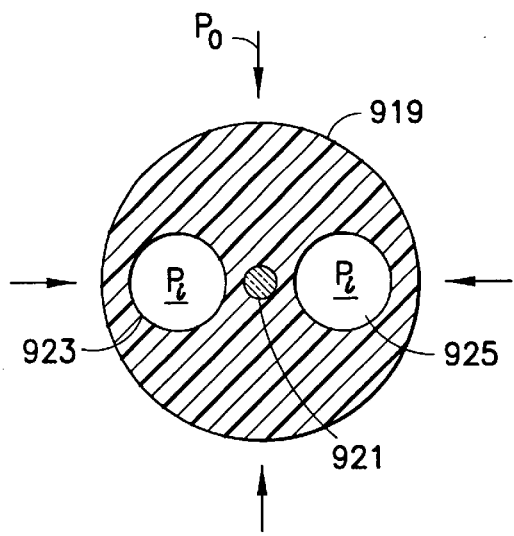
FIG. 10 is a schematic transverse sectional view of a tenth, monopolar embodiment of the invention.
Figure 11:
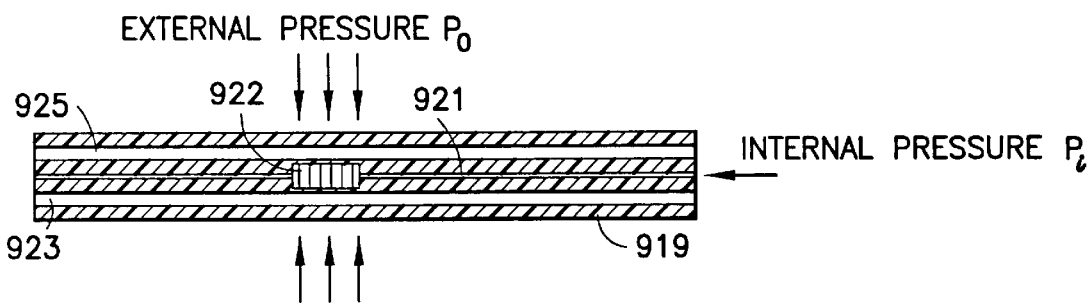
FIG. 11 is a schematic longitudinal sectional view of the tenth, monopolar embodiment of the invention.
Figure 12:
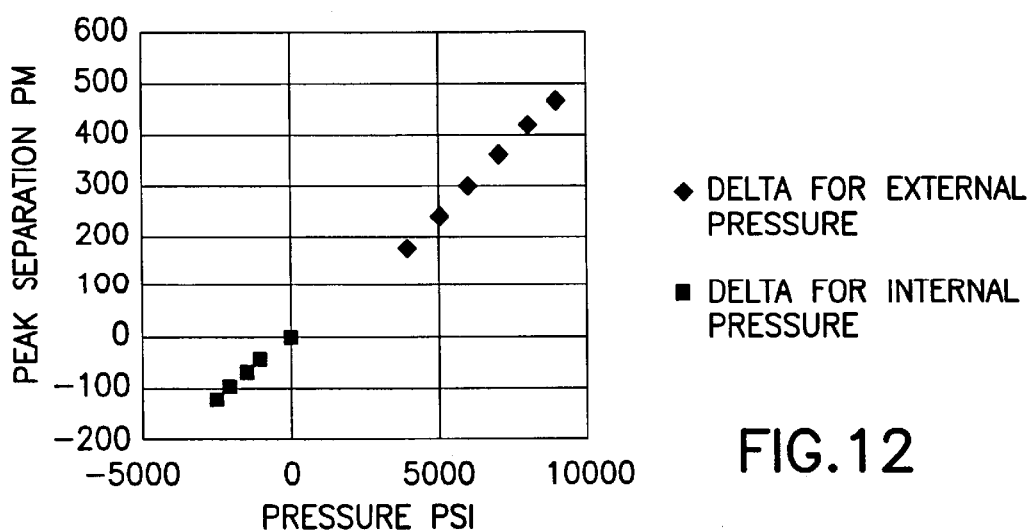
FIG. 12 is a graph illustrating the peak separation as a function of pressure for internal and external pressure.

The nine embodiments described above may also characterized as methods of measuring a differential pressure. According to a tenth embodiment, a method of measuring a differential pressure includes coupling the holes of a side-hole fiber having an FBG to a first pressure source and exposing the exterior of the fiber in the area of the FBG to a second pressure source. Difference in the two pressures causes a transverse strain on the FBG. When the FBG is interrogated, the spectral information is indicative of the transverse strain and thus the difference between the two pressures. FIGS. 10 and 11 illustrate a conventional side-hole fiber optic cable 919 which includes an optical fiber 921 having an FBG 922 and a pair of side holes 923, 925 which extend substantially parallel to the optical fiber. According to this method of the invention, the portion of the cable 919 where the FBG 922 is located is exposed to a first pressure $P_o$ and the interior of the side holes 923, 925 is exposed to a second pressure $P_i$. When the FBG is interrogated, the peak separation corresponding to the stress-induced birefringence in the FBG is proportional to the pressure difference between $P_o$ and $P_i$. Since the structure is monolithic, the temperature compensation effect and the pressure response such as hysteresis and repeatability are superior to other systems. FIG. 12 shows the peak separation as compared to pressure using a 1.5 µm FBGs. As shown in FIG. 12, the absolute pressure response (approximately 0.05 pm/psi) is the same for both internal and external pressure, but the polarity is opposite. Therefore, if external and internal pressure are applied to side-hole fiber at the same time, the peak separation is proportional to the differential pressure $P_o-P_i$.

Figure 13:
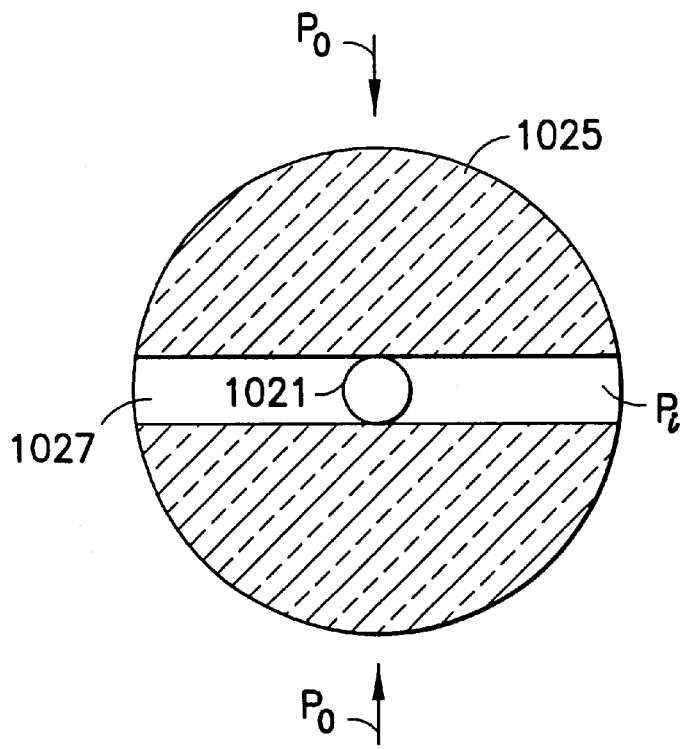
FIG. 13 is a schematic transverse sectional view of an eleventh bipolar embodiment of the invention.
Figure 14:
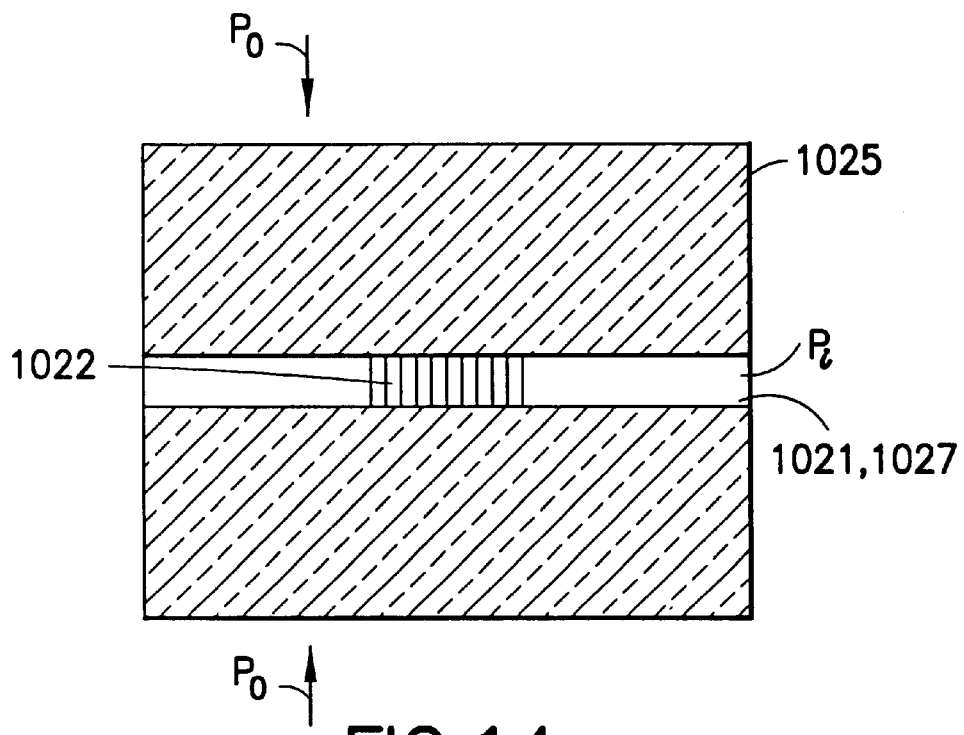
FIG. 14 is a schematic longitudinal sectional view of the eleventh bipolar embodiment of the invention.

FIGS. 13 and 14 illustrate an eleventh embodiment of the invention. According to this embodiment, an optical fiber 1021 having an FBG 1022 is mounted in a micro-capillary tube 1025 having a rectangular opening 1027. The micro-capillary tube is preferably made of fused silica or glass and the fiber 1021 is pre-loaded before it is mounted in the opening 1027. The pre-loading of the fiber fixes the fiber in the tube and also introduces bias birefringence to provide initial peak separation. This results in a semi-monolithic structure which is sensitive to small differential pressure. External pressure $P_o$ is applied to the exterior of the micro-capillary tube 1025 and internal pressure $P_i$ is applied to the opening 1027. The external pressure Po produces a transverse load on the FBG 1022 and the internal pressure Pi reduces the transverse load. The absolute transverse load is a function of the differential pressure $P_o-P_i$. Those skilled in the art will appreciate that in order to seal inner pressure in the micro-capillary tube, high pressure feed-throughs are required.

There have been described and illustrated herein several embodiments of methods and apparatus for measuring differential pressure with fiber optic sensor systems. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. An apparatus for measuring differential pressure, comprising:
   a) a substantially rigid housing;
   b) a first optical fiber having a first fiber Bragg grating (FBG) located within said housing;
   c) a first stressing means for stressing said first FBG, said first stressing means extending at least partially into said housing;
   d) a first pressure coupling means for coupling said substantially rigid housing to a first pressure source; and
   e) a second pressure coupling means for coupling said substantially rigid housing to a second pressure source, wherein
   pressure difference between the first pressure source and the second pressure source causes said first stressing means to move relative to said first FBG and cause a stress in said first FBG.

2. An apparatus according to claim 1, wherein:
   said first stressing means includes a piston having two oppositely extending piston rods, each piston rod extending toward a respective one of said first pressure coupling means and said second pressure coupling means.

3. An apparatus according to claim 2, further comprising:
   f) a pair of fused silica plates inside said housing, said FBG being located between said plates and said piston bearing against one of said plates.

4. An apparatus according to claim 2, further comprising:
   f) a second optical fiber having a second FBG, wherein said piston has a first face and a second opposite face, said first FBG is located between said first face and said housing, and said second FBG is located between said second face and said housing.

5. An apparatus according to claim 4, further comprising:
   g) a first fused silica plate located between said first FBG and said housing;
   h) a second fused silica plate located between said first FBG and said piston;
   i) a third fused silica plate located between said second FBG and said housing; and
   j) a fourth fused silica plate located between said second FBG and said piston.

6. An apparatus according to claim 1, further comprising:
   f) a substantially rigid body having a first concave end, said substantially rigid body being mounted in said housing, wherein
   said first stressing means includes a first diaphragm substantially covering said first concave end, and
   said first FBG is located between said first diaphragm and said substantially rigid body.

7. An apparatus according to claim 6, wherein:
   said first FBG is located between said first diaphragm and said first concave end.

8. An apparatus according to claim 6, wherein:
   said substantially rigid body has a first throughbore extending from said first concave end to an opposite end of said substantially rigid body,
   said first optical fiber extends through said first throughbore to said diaphragm, and
   said FBG is located within said throughbore.

9. An apparatus according to claim 8, wherein:

one of said first and second pressure coupling means includes a second throughhole extending from said concave end to a side surface of said substantially rigid body.

10. An apparatus according to claim 7, wherein:

one of said first and second pressure coupling means includes a first throughhole extending from said concave end to another end of said substantially rigid body.

11. An apparatus according to claim 7, wherein:

said substantially rigid body has a trough intersecting said first concave end, and one of said first and second pressure coupling means includes a flexible tube extending through said trough.

12. An apparatus according to claim 7, further comprising:

g) second stressing means coupled to said first stressing means, wherein said first stressing means is coupled to said first pressure coupling means, and said second stressing means is coupled to said second pressure coupling means.

13. An apparatus according to claim 12, wherein:

said substantially rigid body has a second concave end, and said second stressing means includes a second diaphragm substantially covering said second concave end.

14. An apparatus according to claim 13, wherein:

said substantially rigid body has a throughbore extending from said first concave end to said second concave end.

15. An apparatus according to claim 14, wherein:

said first diaphragm and said second diaphragm are coupled to each other by a substantially rigid member which extends through said throughbore.

16. An apparatus according to claim 14, wherein:

said first diaphragm and said second diaphragm are coupled to each other by an uncompressible fluid which substantially fills said throughbore and the spaces between said diaphragms and said concave ends.

17. An apparatus according to claim 15, further comprising:

h) a second optical fiber having a second FBG, wherein said second FBG is located between said second diaphragm and said second concave surface.

18. An apparatus according to claim 16, further comprising:

h) a second optical fiber having a second FBG, wherein said second FBG is located between said second diaphragm and said second concave surface.

19. An apparatus according to claim 1, wherein:

said first optical fiber is selected from the group consisting of PM fiber and side-hole fiber.

20. An apparatus according to claim 1, wherein:

said first stressing means is made of fused silica.

21. An apparatus according to claim 1, wherein:

said first stressing means is a micro-capillary tube.

22. An apparatus according to claim 21, wherein:

said micro-capillary tube is made of a material selected from the group consisting of fused silica and glass.

23. A method for measuring differential pressure using an optical fiber having a fiber Bragg grating (FBG), said method comprising:

a) locating a member adjacent to the portion of the fiber containing the FBG;

b) exposing the member to two different pressures such that the action of one pressure causes the member to move in one direction and the action of the other pressure causes the member to move in a different direction;

c) interrogating the FBG; and d) measuring the peak separation detected by said interrogating.

24. A method according to claim 23, wherein:

the member is a side-hole cladding surrounding the FBG, and said step of exposing includes exposing the interior of the side holes to one pressure and exposing the exterior of the cladding to another pressure.

* * * * *